Dec. 4, 1973  L. C. FRAZIER  3,776,793
METHOD OF INCORPORATING TIRE BEADS INTO A TIRE
Original Filed Feb. 19, 1970  5 Sheets-Sheet 4
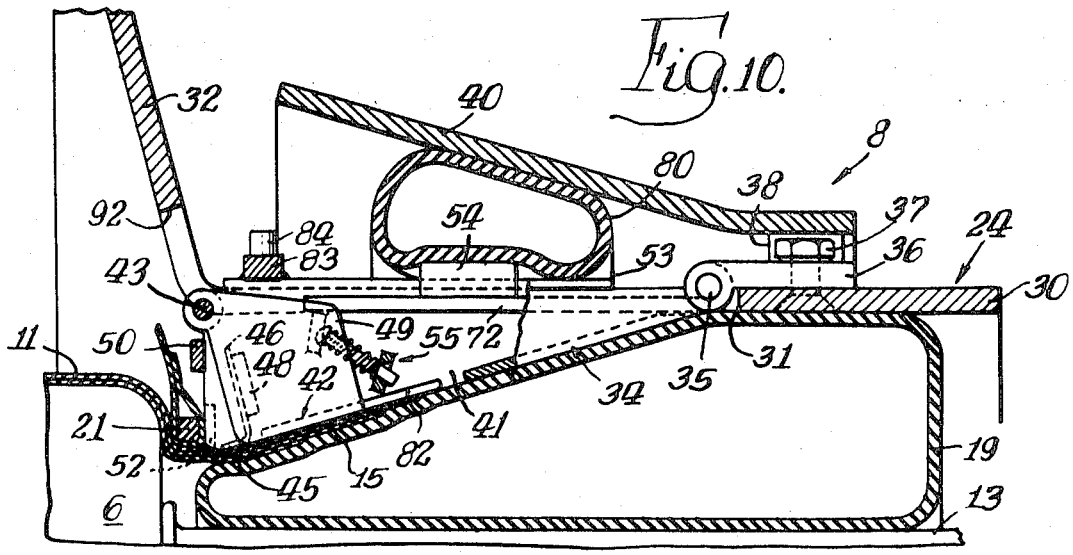
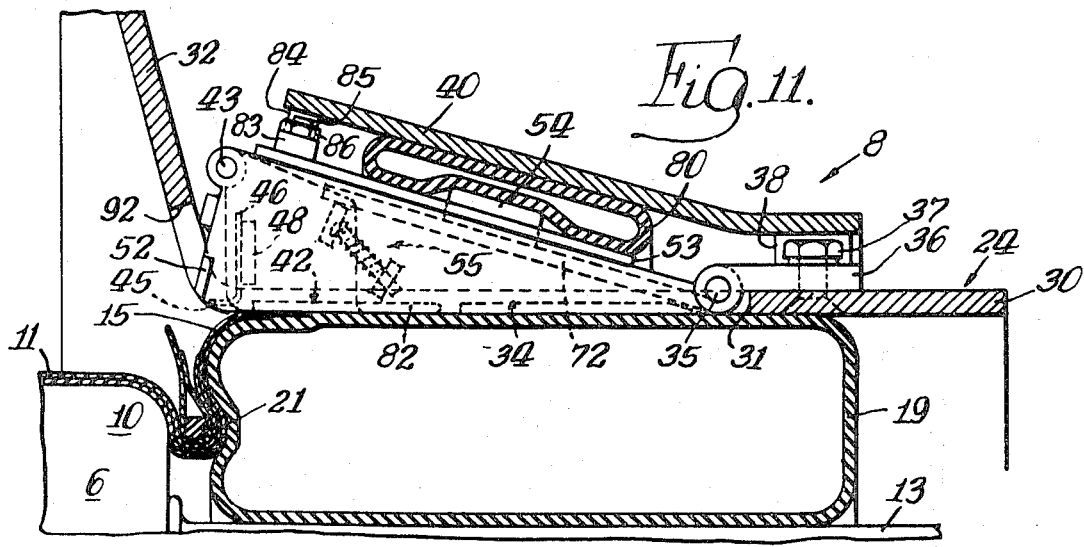
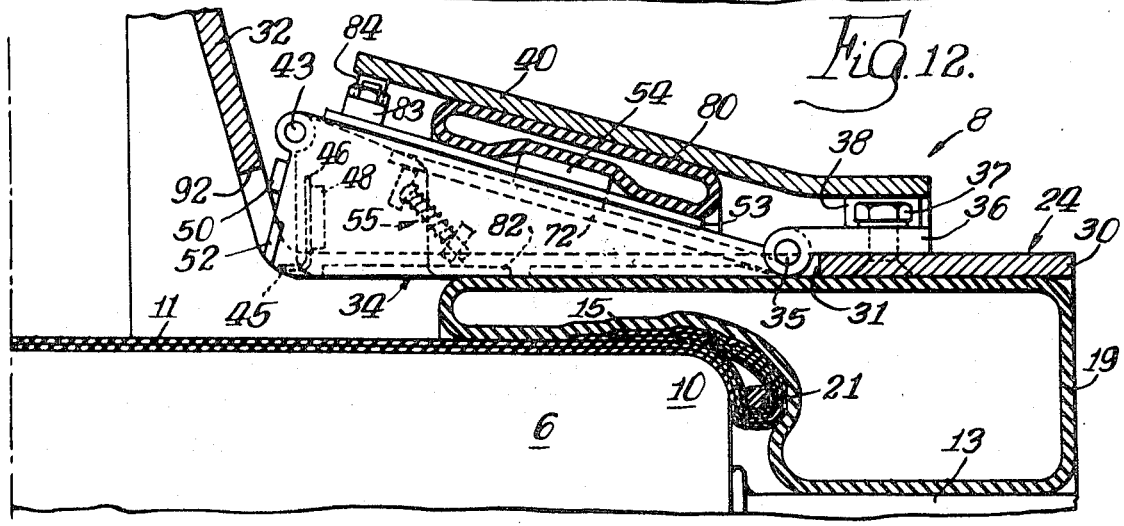

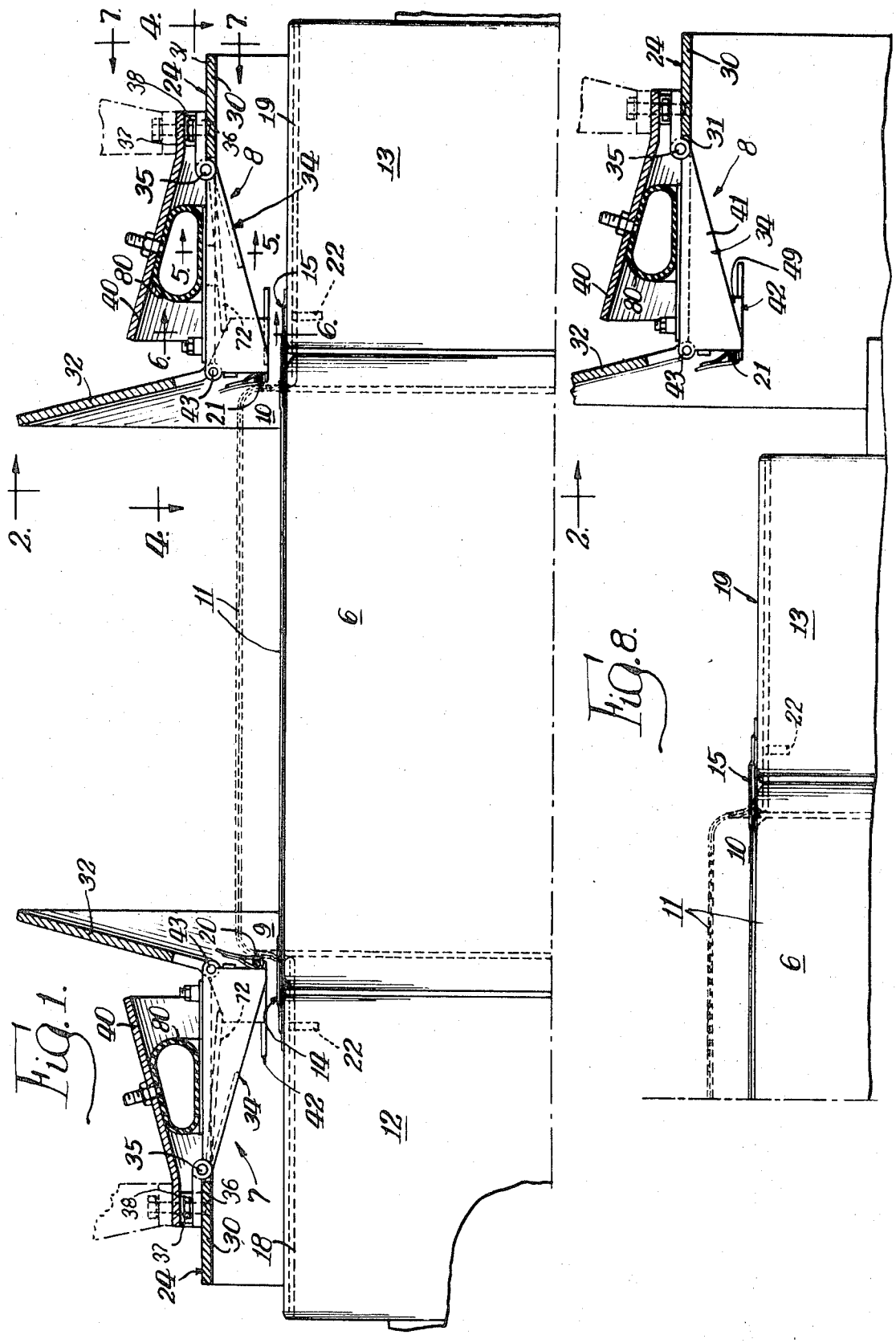

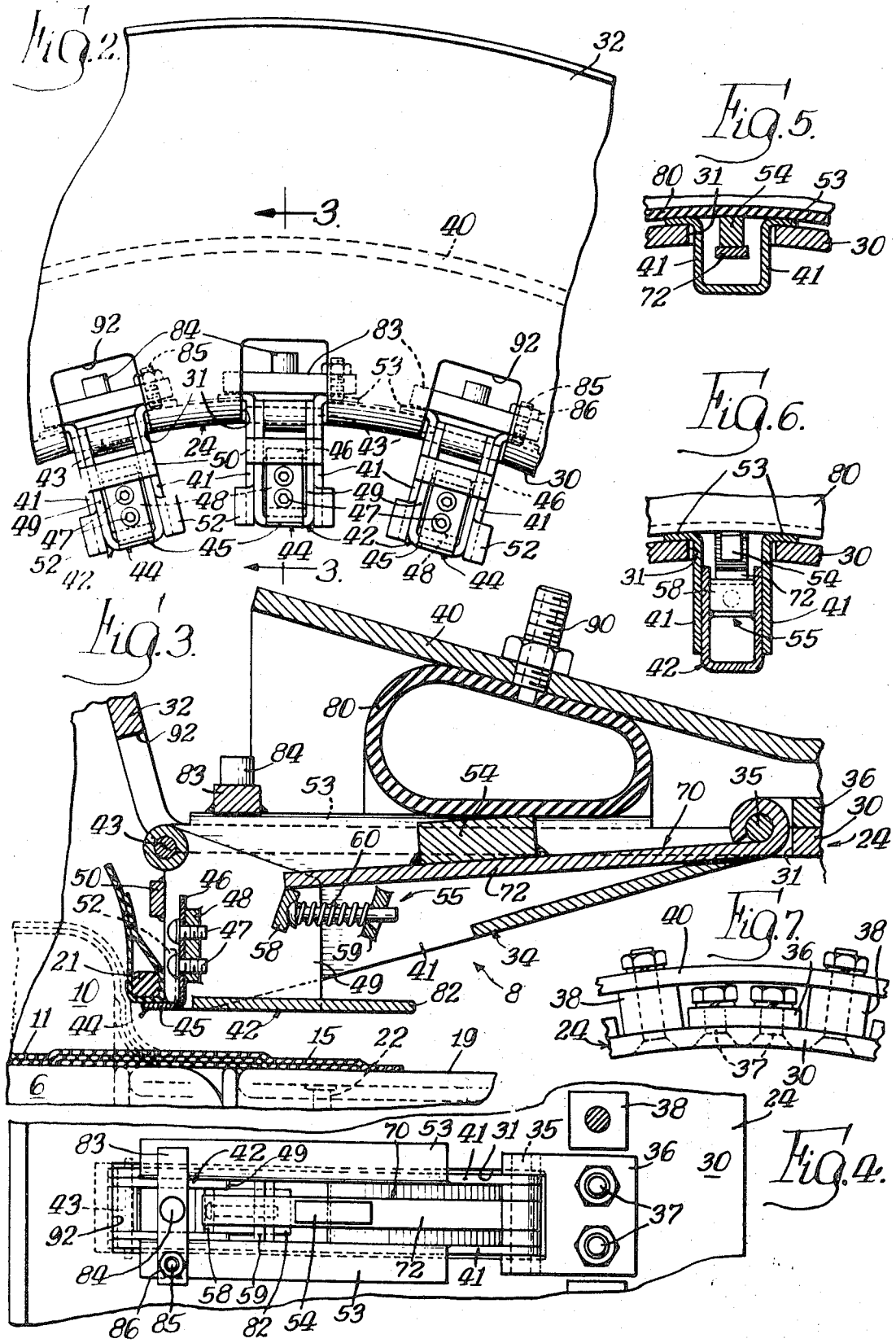

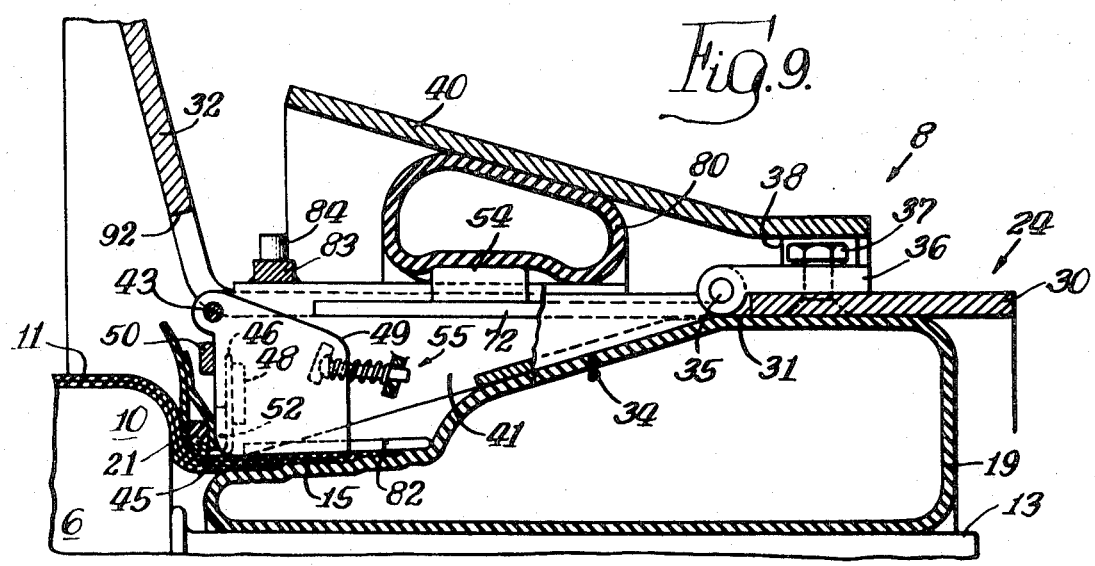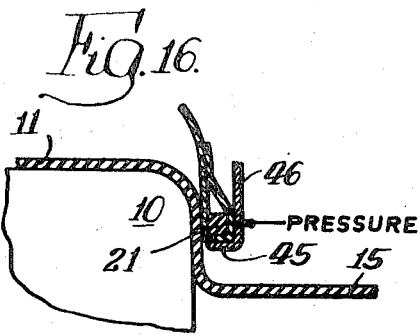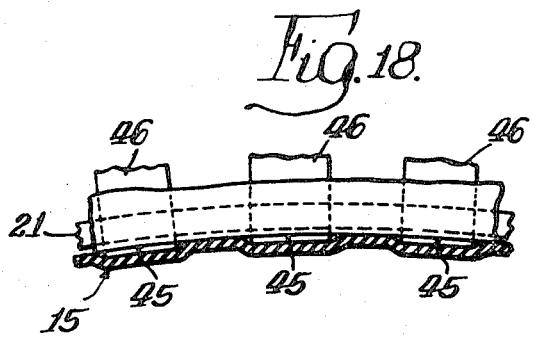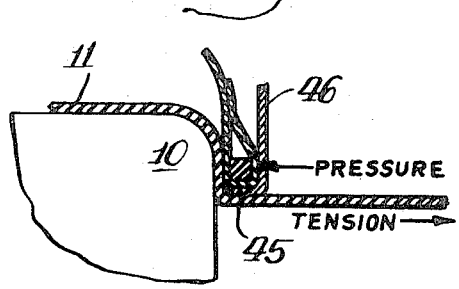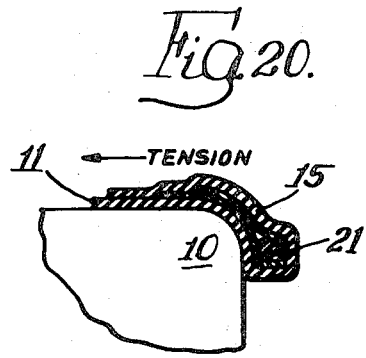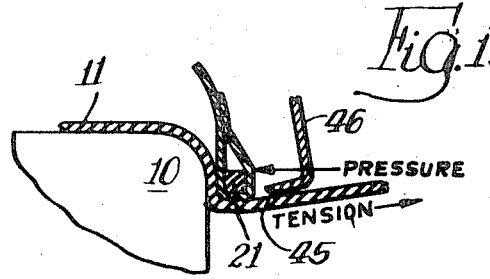

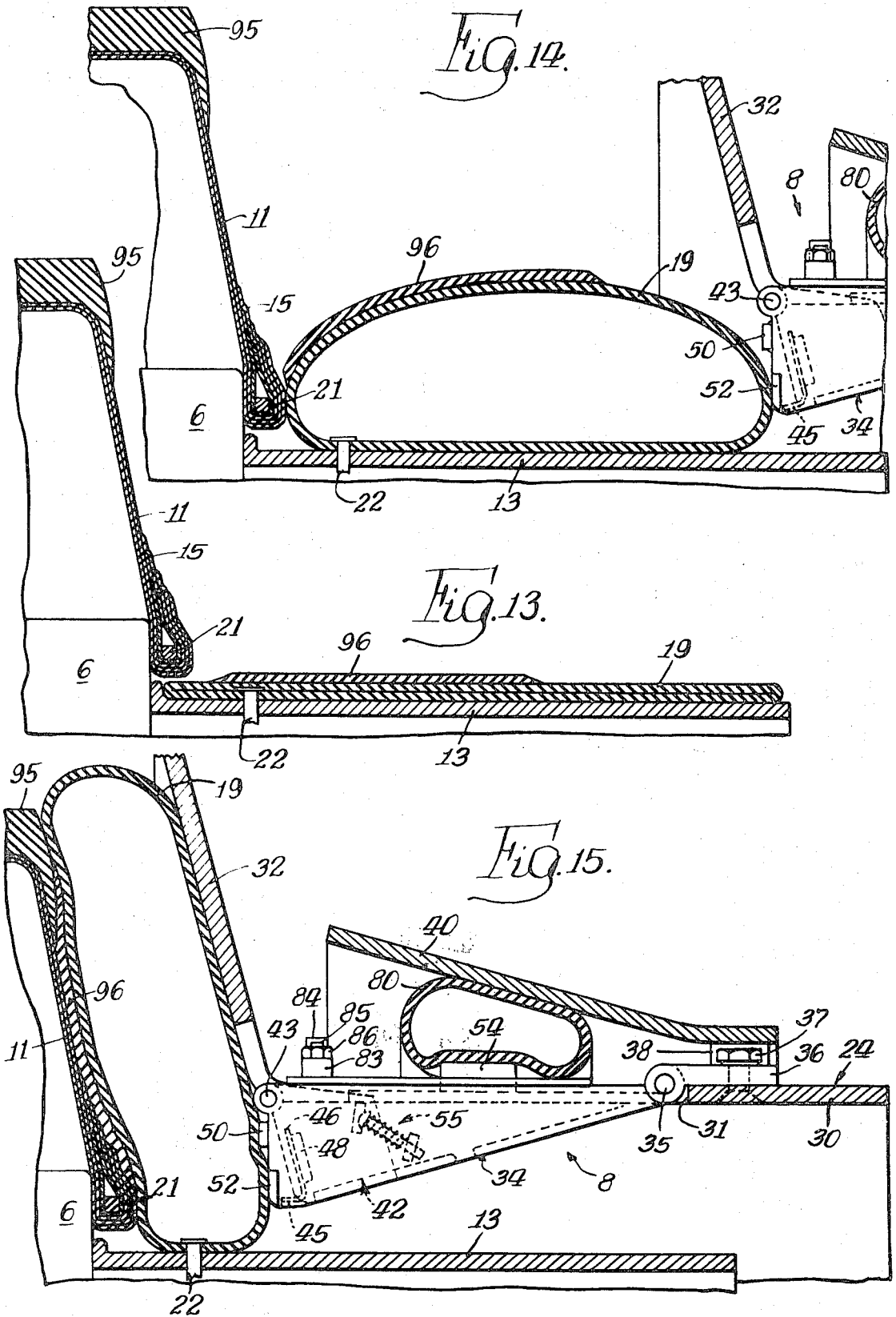

United States Patent Office 3,776,793
Patented Dec. 4, 1973

3,776,793
METHOD OF INCORPORATING TIRE BEADS INTO A TIRE
Larry C. Frazier, Sun City, Ariz., assignor to National-Standard Company, Niles, Mich.
Original application Feb. 19, 1970, Ser. No. 12,774, now Patent No. 3,645,827. Divided and this application Nov. 3, 1971, Ser. No. 195,147
Int. Cl. B29h 17/12, 17/22
U.S. Cl. 156—132
2 Claims

ABSTRACT OF THE DISCLOSURE

Method of building a tire in which tire carcass material is formed with tire bead shoulders from which outer end portions of tire carcass material extend, supporting tire beads concentrically at the tire bead shoulders, freeing the support of the tire beads while maintaining the tire beads against the tire bead shoulders and partially encase the tire beads in the outer end portion of the tire carcass material, and then displacing the outer end portions of the tire carcass material over the tire beads and onto the tire carcass material at the tire beads to fully encase the tire beads.

---

This application is a division of my pending application Ser. No. 12,774, filed Feb. 19, 1970, now U.S. Pat. 3,645,827.

BACKGROUND

In the building of tires, it is conventional practice to dispose of a tire bead inwardly of each of the opposite end portions of tire carcass material and the intermediate portion of which is supported on a drum to define tire bead shoulders, with the tire beads being held in place against the shoulders by adhesion of the gums of the tire carcass material and tire beads. Thereafter the opposite outer end portions of the tire carcass material are turned over the tire beads and adhered to the portions of the carcass material axially inwardly of the tire bead shoulders. This widely employed practice is of disadvantage especially when, as is frequently the case, tire beads are elliptical rather than of true circular configuration. In such instances even after application of a tire bead against a tire bead shoulder of tire carcass material supported on a drum by a circular bead placing ring, upon removal of the bead placing ring to enable turning up the ends of the tire carcass material, the tire bead will frequently resume its elliptical configuration in that the adhesion of the holding gums is insufficient to retain the tire bead circular or concentric with respect to the drum. Thus such a tire bead is not properly incorporated in the tire.

The art sought to overcome the disadvantage of the foregoing practice by embodying radially expansible bead holding means lying inwardly of the carcass material on an inflatable main drum, in which expansible tire bead holding means are radially outwardly expanded against the inflatable drum to hold the tire beads in predetermined fixed relation around the tire carcass material. In such an arrangement of parts an inflatable main drum is highly unsatisfactory in that it does not provide a firm tire building surface. In addition, separate mechanisms are provided for making the turn-ups of the ends of the carcass material over the tire beads. This approach to the problem requires separate structures for holding the tire beads and making the turn-ups and adds to the complexity of operation of the tire building apparatus.

It is also known prior to my present invention in order to avoid the aforenoted disadvantages to provide tire building apparatus embodying combined tire bead holder and turn-up means which serve to retain a tire bead concentric with the building drum until a tire bead is partially encased by the carcass material, and after which the turn-up is completed to fully encase the tire bead in the carcass material.

The invention is concerned with the method of building a tire in which tire beads are held against tire bead shoulders inwardly of outer end portions of the tire carcass material, in which the tire beads are initially supported concentrically at the tire bead shoulders tensioning the outer end portion of the tire carcass material and initially partial encase portions of the tire beads, followed by freeing the support of the tire beads but holding them against the tire bead shoulders, and in which the outer end portions of the tire carcass material are further displaced to further partially encase the beads followed by displacing the end portions over the tire beads to fully encase the tire beads. The method, as last noted, in which the tire carcass material with the encased beads is then formed into substantially torous configuration for the application of side wall components to the sides of the tire carcass material. Also other components, such as a tread component, for the tire may also be applied to the periphery of the torous configuration of the tire carcass material.

BRIEF DESCRIPTION OF THE DRAWING

FIG. 1 is a longitudinal sectional view of tire building apparatus with which the method of the present invention may be practiced with the parts in position for holding tire beads against tire bead shoulders of tire carcass material on a tire building drum;

FIG. 2 is a vertical sectional view taken along the line 2—2 on FIG. 1, looking in the direction indicated by the arrows;

FIG. 3 is an enlarged sectional view taken on the line 3—3 on FIG. 2;

FIG. 4 is a plan view taken substantially along the line 3—3 on FIG. 1;

FIG. 5 is a detail vertical sectional view taken along the line 4—4 on FIG. 1 looking in the direction indicated by the arrows;

FIG. 6 is a detail vertical sectional view taken along the line 5—5 on FIG. 1 looking in the direction indicated by the arrows;

FIG. 7 is an end elevational view taken along the line 6—6 on FIG. 1 looking in the direction indicated by the arrows;

FIG. 8 is a view of the upper right-hand quarter of the apparatus shown in FIG. 1, but showing the initial position of the parts before placing of a tire bead against a tire bead shoulder as seen in FIG. 1;

FIG. 9 is a view of the right-hand upper quarter of the apparatus but showing the position of the parts following that of the position of the parts shown in FIG. 1;

FIG. 10 is a view of the right-hand upper quarter of the apparatus of FIG. 1 but showing the position of the parts following that of the position of the parts shown in FIG. 9;

FIG. 11 is a view similar to that of FIG. 10 showing the position of the parts for encasing a substantial portion of the tire bead in the tire carcass material;

FIG. 12 is a view similar to FIG. 11 but showing the position of the parts when the tire bead is fully encased in the tire carcass material;

FIG. 13 is a view of certain of the components of FIG. 1 in initial position preparatory to applying a side wall component to the side wall portion of a tire carcass of torous configuration;

FIG. 14 is a view showing the position of the parts at the start of the application of a side wall component to the side wall of the tire carcass;

FIG. 15 is a view showing the position of the parts at which the application of the side wall component to the side wall portions of a tire carcass is completed; and FIGS. 16 through 20 are diagrammatic illustrations showing the sequence of encasing the beads in the end portions of the tire material.

DETAILED DESCRIPTION OF A PREFERRED EMBODIMENT OF AN APPARATUS FOR PRACTICING THE METHOD OF THE INVENTION

Referring now to FIG. 1 there is shown a tire building apparatus comprising a main tire building drum 6, and first and second tire bead holding and turn-up means 7 and 8 disposed at opposite ends of the main drum 6. The main drum 6 may be of any desired construction to provide as shown in FIG. 1 tire bead shoulders 9 and 10 at its opposite ends adjacent the tire bead holding and turn-up means 7 and 8, respectively. If desired, the drum 6 may embody, as is known, radially inwardly and outwardly and circumferentially movable segments to provide in an inner radial position thereof with drum means 12 and 13 of the tire bead holding and turn-up means 7 and 8, respectively, an initial cylindrical surface for supporting tire carcass material such as shown at 11, therearound for the carcass of a tire, and which main drum 6 may then be expanded radially outwardly to provide the tire bead shoulders such as at 9 and 10. A main drum 6 of the construction referred to is preferred, but if desired other known drums may be employed, such as the radially expansible bag type of drum. Also, if desired, the drum could be of the construction initially providing tire bead shoulders 9 and 10 and about which the tire carcass material with end portions of the tire carcass material as at 14 and 15 for the turn-ups being supported on first inflatable bag means 18 and 19, supported on the drums 12 and 13, respectively.

After laying of the tire carcass material about the main drum 6 and first inflatable bag means 18 and 19 of drums 12 and 13, respectively, as shown in FIG. 1, the shoulders 9 and 10 provide tire bead shoulders at opposite ends of the main drum for the tire beads 20 and 21, respectively.

The tire bead holding and turn-up means 7 and 8 are of like construction in view of which the following description will be directed to the tire bead holding and turn-up means 8 at the right-hand end of the main drum 6 and in which like reference numerals applied to the tire bead holding and turn-up means 7 indicated the same or comparable parts.

The tire bead holding and turn-up means 8 further comprises a port 22 providing for admission and release of fluid under pressure, such as air, into and out of the first inflatable bag 19 to inflate and deflate the latter as will be below described.

The tire bead holding and turn-up means 8 further comprises a main frame 24 mounted in any suitable manner (not shown) for movement axially inwardly and outwardly relative to the main drum 6.

The main frame 24 comprises a cylindrical portion 30 provided with a plurality of lengthwise extending elongated slots 31, and a flared side wall pusher member 32 the function of which will be below described.

Bead placer means 34 are positioned in each of the slots 31 of the cylindrical portion 30 of the main frame 24. Each bead placer means 34 is pivotally mounted as at 35 in a bracket 36 bolted as at 37 adjacent the outer end of the cylindrical portion 30. As best seen in FIGS. 4 and 7 a plurality of spacer members 38 are disposed between adjacent brackets 36 and to which as will be seen in FIGS. 1 and 3 the outer end of a cone shape tube restraining member 40 is bolted by bolts passing through the spacer members 38 and anchored in the cylindrical member 30.

Upon reference to FIGS. 2 through 6 it will be see that each of the bead placer means 34 comprises spaced apart side walls 41 between which there is located bead finger frame means 42 pivoted as at 43 at the inner upper ends of the side walls 41. The bead finger frame means 42 provides for the support of a bead supporting finger member 44 havng an axially extending bead supporting flange portion 45 and a radially extending mounting portion 46. A plurality of bolts 47 are provided for securing the radially extending portion 46 of the bead finger to a transversely extending wall 48 extending between the side walls 49 of the bead finger frame means 42. The several bead supporting fingers 45 of each of the several bead finger frame means 42 for the support of tire bead 21 concentrically of the axis of drum 6 and adjacent tire bead shoulder 10. A cross bar 50 extends across the forward ends of side walls 41 below the pivot 43 to reinforce the bead placer means at its inner end. Also, the side walls 41 at the lower portion of the inner ends are formed with integral laterally outwardly extending bead engaging flanges 52 which as will appear support the tire bead against the tire bead shoulders in the operation of the apparatus in fabricating a tire. Also, as best seen in FIGS. 1, 2 and 3 the side walls 41 at their upper edges are formed with integral laterally outwardly extending flanges 53.

An overcenter spring means 55 best illustrated in FIG. 3 is arranged between bead placer means 34 and bead finger frame means 42. The overcenter spring means 55 comprises a rivet extending between a cross bar 58 extending between the side walls 49 of the bead finger frame means 42 and a cross frame 59 extending between side walls 41 of bead placer means 34. A compression spring 60 is disposed about the shank of the rivet and is under compression between the head of the rivet which is engaged with the cross bar 58 and the cross frame 59. The free end of the rivet extends freely through the cross frame 59. The arrangement is such that the aforedescribed overcenter spring means 55 in the position of the parts shown in FIG. 1 maintains the several bead finger frame means 34 in operative position for supporting a tire bead concentrically of the drum adjacent a bead shoulder.

In FIGS. 3 and 4 there is illustrated restraining means 70 for restraining movement of the aforedescribed bead finger frame means 42 from its aforedescribed operative position comprising a lever 72 pivoted at its outer end on the pivot pin 35. An abutment member 54 is carried by lever 72 and is adapted to engage a second annular inflatable bag means 80 disposed between cone member 40 and the upper end of the bead placer means 34. The inner periphery of the annular bag means 80 is supported by the flanges 53 of the side plates 41 with the spaced apart side walls 41 and 49 permitting pivotal movement of the lever 72 about its pivot axis. Thus as shown in FIG. 1, the first inflatable bag means 19 is deflated, and second inflatable bag means is inflated and by reason of its engagement with abutment 54 of the lever 72 holds the latter in engagement with the cross bar portion 58 of bead finger frame means 42 disposing the latter with the tire bead supporting fingers 45 in tire bead supporting position.

The bead finger frame means 42, see FIG. 3, is formed with a bottom wall 82 adapted to be engaged by inflatable bag means 19 upon inflation thereof for purposes described below.

It will be further noted as best seen in FIGS. 2, 3 and 4 that a cross bar 83 extends between and is secured to the forward end portion of flanges 53 of bead placer means 34, and from which a stop member 84 extends outwardly and upwardly for engagement in operation of the apparatus with the outer end of bag restraining member 40 to limit outward movement of bead placer means 34 about its pivot 35. An adjusting screw 85 has threaded engagement with the cross bar 83 and at its inner end bears against the cylindrical portion 30 of frame means 24. A lock nut 86 serves to retain the adjusting screw 85 in adjusted position. Thus the adjusting screw 85 provides for disposing the bead placer means 34 in a predetermined position about its pivot 35, and consequently disposes the bead finger frame means 34 in a predetermined position, which, of course, determines the position of the bead supporting flanges 45 of the bead supporting fingers 44. It will thus be seen that the bead supporting flange 45 of the bead supporting finger 44 may be positioned at different predetermined diameters and that the adjusting screw 85 associated with cross bar 83 of each of the several bead placer means 34 provides for the micro-adjustment of the several bead supporting fingers 44 to accurately fit the inside diameter of a tire bead to be supported on the bead supporting fingers 44. Bead supporting fingers 44 of any desired dimension may be readily incorporated in the apparatus and the aforedescribed adjusting means provides for the fine adjustment of the several fingers to accurately support a tire bead in true concentric relation to the shoulder of a tire building drum.

OPERATION OF ABOVE DESCRIBED APPARATUS AND DESCRIPTION OF METHOD OF THE INTERIOR

As shown in FIG. 1 the tire carcass material 11 is disposed around the main drum 6 and the end drums 12 and 13 providing tire bead shoulders at 9 and 10 at the ends of the main drum 6. The tire bead holding and turn-up means 7 and 8 are shown in FIG. 1 in their axially inner positions disposing the beads 20 and 21, respectively, at the tire bead shoulders 9 and 10. The tire bead holding and turn-up means at the start of a tire building operation are disposed axially away from the drum as illustrated in FIG. 8 and in the latter position the tire beads are mounted on the bead supporting fingers 45. Thereafter the tire bead holding and turn-up means 7 and 8 are moved axially inwardly to the positions shown in FIG. 1. The tire beads 20 and 21 as shown in FIG. 1 and as diagrammatically shown in FIG. 16 are in concentric supported relation with respect to the tire bead shoulders 9 and 10. The following description beginning with FIG. 9 will be with reference to the upper right-hand portion of the apparatus shown in FIG. 1.

In the position of the parts as shown in FIG. 9 and second inflatable bag means 80 of the tire bead holding and ply turn-up means 8 is charged with fluid under pressure through the stem 90 holding bead placer frame means 80 in the position illustrated. In this position the first inflatable bag means is initially inflated to axially outwardly tension the outer end portions 14 and 15 of the tire carcass material as diagrammatically illustrated in FIG. 17 from which together with FIGS. 9 and 18 that portions of the outer end portions of the tire carcass material are stitched or applied to the portions of the tire beads between the circumferentially spaced apart bead supporting fingers 44. Thereafter and as best seen in FIGS. 10 and 19 the second inflatable bag means 80 of the tire bead holding and ply turn-up means 8 remains charged with fluid under pressure through the stem 90 holding bead placer frame means 34 in the position illustrated. Fluid under increased pressure is then admitted through stem 22 into the first inflatable bag means 19. The flanges 52 of bead placer frame means are held in engagement with the tire bead 21. As the first inflatable bag means 19 is further inflated and as shown in FIG. 10, the tensioned outer end portion 15 of the tire carcass material is clamped between the first inflatable bag means 19 and the bottom wall 82 of bead finger frame means 42. Continued inflation of the first inflatable bag means 19 effects pivoting of the bead finger frame means 42 to the position shown in FIG. 10 in which the bead finger frame means 42 has pivoted around pivot pin 43 withdrawing or freeing the bead supporting portions 45 of the fingers 44 away from the inner periphery of the tire bead 21. During the last noted continued inflation of bag means 19 the overcenter spring means 55 is being moved toward tripping position and when fully tripped as shown in FIG. 10 the bead supporting fingers 45 are freed from the beads 21. Overcentering of the spring means 55 is achieved by engagement of abutment 54 with second bag means 80 resisting movement of lever 72 until the latter reaches a position at which the cross member 59 passes center with the bead finger frame means 44 moving to the position shown in FIG. 10. The inwardly facing flanges 52 of the bead placer means 34 remain in engagement with the bead 21 and continue to hold the bead in tight engagement with the tire carcass material at the bead shoulder 10.

As will next be seen in FIG. 11 upon continued inflation of the first bag means 19 and the controlled deflation of the second bag means 80, the bead placer means 34 is pivoted about its pivot 35 to dispose the bead placer means 34 as well as the bead finger frame means 42 radially outwardly of the periphery of the main drum 6. A cut-out 92 in the side wall pusher member 32 provides for disposal of the bead finger frame means 42 to the position shown. Also the inner end portion of first bag means 19 has expanded radially outwardly laying the tire carcass material on the outer side surface of tire bead 21. With the parts in the position shown in FIG. 11 from which it will be seen that the outer end portion 15 of the tire carcass material is secured between the bead placer means 34 and the first inflatable bag means 19, initiation of the turn-up is effected by axial inward movement of the tire bead holder and ply turn-up means 8 toward and over the main drum 6. In this position of the parts the axial inward movement of the tire bead holding and turn-up means 8, as shown in FIG. 12, and diagrammatically in FIG. 20 has effected differential rolling under tension of the outer end portion 15 of the tire carcass material 11 over the tire bead 21 and onto the tire carcass material on the main drum axially inwardly of the tire bead shoulder 10 to complete the ply turn-up. It will be noted from FIG. 11 that upon energization of the first inflatable bag means 19 and deflation of the second bag means 80 the first inflatable bag means 19 conditions the parts for movement of the bead placer means 34 to its radial inner position for effecting differential rolling of the outer end portion 15 of the tire carcass material in forming the ply turn-up. After formation of the ply turn-up the tire bead holding and ply turn-up means are returned to the axially outer end positions.

The invention as thus far described has utility for incorporating tire beads in tire carcass material as, for example, in the fabrication of a bias angle tire. In such instance the tire carcass material with the encased beads may be removed from the main tire building drum 6 for further known fabrication operations. However, should the apparatus and method of the invention be employed in the fabrication of radial tires, the main drum 6 is of a character to effect radial expansion of the tire carcass material into torous configuration as shown in FIG. 13. With the tire carcass material in torous configuration a tire tread component as indicated at 95 may be applied to the outer periphery thereof. Also, the invention lends itself to application of side wall components to the sides of the tire carcass material of torous configuration. For this purpose and as shown in FIG. 13, which again illustrates the upper right-hand quadrant of the apparatus, the tire bead holding and ply turn-up means 8 has been retracted exposing the deflated first bag means 19, and a side wall component 96 has been applied to the deflated first bag means 19. Thereafter, and as shown in FIG. 14, the first inflatable bag means 19 is inflated and the tire bead holding and ply turn-up means 8 is advanced axially toward the main drum 6 engaging the inner end of bead placer frame means 34 with the outer end of inflated first bag means 19. The second inflatable bag means 80 is in fully inflated condition. Upon continued inflation of the first inflatable bag means 19 and axially advancing of the tire bead holding and ply turn-up means 8 in a direction toward the main drum 6, the side wall component 96 is laid up against and stitched to the side wall portion of the tire carcass material by pressure applied to the first inflatable bag means 19 by side wall pusher plate 32 and the inner end of bead placer frame means 34. After completion of the application of the side wall component 96, the first bag means 19 is deflated and the tire bead holding and ply turn-up means 8 retracted to its FIG. 8 starting position, and upon collapsing of the main drum 6, the formed tire carcass having beads encased therein together with the applied tread component and side wall components may be removed from the drum for further fabrication operations.

The invention claimed is:

1. The method of building a tire comprising the steps of forming tire carcass material with tire bead shoulders in which outer end portions of the tire carcass material extend away from the tire bead shoulders, supporting circumferentially spaced apart portions of the inner peripheries of tire beads to hold the tire beads in concentric relation with respect to the tire bead shoulders, tensioning the end portions of the tire carcass material in a direction axially outwardly away from the tire bead shoulders and engage the portions of the tire carcass material with the inner peripheries of the tire beads between the circumferentially spaced apart portions thereof, while maintaining the tire beads against said shoulders freeing the circumferentially spaced apart portions of said tire beads while maintaining the outer end portions of the tire carcass material under tension, and then with maintained tension on said outer end portions of said tire carcass material while gradually releasing the force holding said tire beads against said shoulders displacing the outer end portions of the tire carcass material over the tire beads to encase the tire beads.

2. The method of claim 1 characterized by forming the tire carcass material with the tire beads encased therein into substantially torous configuration, and then applying side wall components to the sides of the tire carcass material of torous configuration.

References Cited

UNITED STATES PATENTS

| 3,490,980 | 1/1970 | Mallory et al. | 156—132 X |
| 3,078,204 | 2/1963 | Appleby | 156—401 X |
| 3,409,490 | 11/1968 | Pacciarini et al. | 156—123 |
| 2,605,198 | 7/1952 | Haase | 156—132 |
| 3,188,260 | 6/1965 | Nebout | 156—401 X |

CLIFTON B. COSBY, Primary Examiner

U.S. Cl. X.R.

156—132, 400, 403